United States Patent [19]

Kong-Chan

[11] Patent Number: 4,810,516

[45] Date of Patent: Mar. 7, 1989

[54] REDUCED CALORIE AND REDUCED FAT CHOCOLATE CONFECTIONERY COMPOSITIONS

[75] Inventor: Josephine L. Y. Kong-Chan, West Chester, Ohio

[73] Assignee: The Procter & Gamble Company, Cincinnati, Ohio

[21] Appl. No.: 19,837

[22] Filed: Feb. 27, 1987

[51] Int. Cl.⁴ .............................................. A23G 1/00
[52] U.S. Cl. ..................... 426/548; 426/613; 426/631; 426/658; 426/660; 426/654; 426/804
[58] Field of Search ............... 426/804, 631, 660, 548, 426/613, 654

[56] References Cited

U.S. PATENT DOCUMENTS

| | | | |
|---|---|---|---|
| 2,999,023 | 9/1961 | Babayan et al. | 99/118 |
| 3,158,490 | 11/1964 | Baur et al. | 426/607 |
| 3,579,548 | 5/1971 | Whyte | 426/804 |
| 3,595,673 | 7/1971 | Seiden | 99/118 |
| 3,600,186 | 8/1971 | Mattson | 426/804 |
| 3,649,647 | 3/1972 | Ota et al. | 426/631 |
| 3,737,322 | 6/1973 | Frey | 426/660 |
| 3,865,957 | 2/1975 | Schieweck et al. | 426/213 |
| 3,876,794 | 4/1975 | Rennhard | 426/152 |
| 3,957,976 | 5/1976 | Sugimoto | 424/180 |
| 4,363,763 | 12/1982 | Peterson | 260/410.7 |
| 4,461,782 | 7/1984 | Robbins | 426/804 |
| 4,508,746 | 4/1985 | Hamm | 426/804 |
| 4,524,086 | 6/1985 | Player | 426/660 |
| 4,626,441 | 12/1986 | Wolkstein | 426/548 |
| 4,664,927 | 5/1987 | Finkel | 426/613 |

FOREIGN PATENT DOCUMENTS 1418544  12/1975  United Kingdom .

OTHER PUBLICATIONS

Dwivedi, Basant K., *Low Calorie and Special Dietary Foods*, CRC Press (1978), pp. 66–67, and pp. 110–111.

Y. Nakanishi and S. Shiomi, "The Effect of a New Emulsifier (British) and Sucrose Ester of Fatty Acids (Japanese) on the Viscosity of Chocolate", Rev. Int. Choc. (RIC) 26 (1971) 8, Aout.

Y. Nakanishi et al., "The Effect of Sucrose Esters in Chocolate and Cocoa", Rev. Int. Choc. (RIC) 20 (1965), 4 Avril.

European Patent Office Search Report.

*Primary Examiner*—Jeanette Hunter
*Attorney, Agent, or Firm*—Karen F. Clark; Ronald L. Hemingway; Richard C. Witte

[57] ABSTRACT

Reduced calorie chocolate confections in which a nondigestible polyol fatty acid polyester is substituted for the natural fat, and an artificial sweetener plus a partially or wholly nondigestible carbohydrate bulking agent is substituted for sugar.

9 Claims, No Drawings

REDUCED CALORIE AND REDUCED FAT CHOCOLATE CONFECTIONERY COMPOSITIONS

FIELD OF THE INVENTION

The invention pertains to reduced calorie and reduced fat chocolate confections.

BACKGROUND OF THE INVENTION

There is increasing interest among customers in food products having a reduced fat and reduced calorie content.

Confectionery chocolate compositions generally comprise about 30–60% sugar, 10%–70% chocolate liquor (which contains about 50% cocoa butter), 20%–25% added cocoa butter and about 1% flavor and miscellaneous.

Because of their high fat and sugar content, chocolate confections have a high caloric value per unit weight. There is significant need for chocolate confectionery compositions which have a substantially reduced fat and reduced calorie content and yet which provide the gustatory and physical properties of conventional chocolate confectionery compositions.

U.S. Pat. No. 4,363,763, Peterson, issued Dec. 14, 1982, discloses certain polyol esters of a-hydroxy fatty acids as food emulsifiers. Among the food products disclosed in this patent is a chocolate confection (Example IX). The patent states at Col 12, lines 1–7, that cocoa butter in such confections can be replaced with a solid nondigestible (i.e., noncaloric) polyol polyester. The patent also discloses sucrose polyesters as preferred nondigestible polyol polyesters.

U.S. Pat. No. 4,626,411, Wolkstein, issued Dec. 2, 1986, pertains to dietetic frozen desserts (i.e., ice creams). In these compositions, sugar is replaced by a combination of non-caloric sweetener (e.g., aspartame, saccharin, etc.), and a noncaloric carbohydrate bulking agent (to substitute for the bulk normally provided by sugar). The reference also discloses that sucrose polyesters can be used as a substitute for fat.

U.S. Pat. No. 3,876,794, Rennhard, Apr. 8, 1975, discloses certain polyglucoses and polymaltoses which can be used as noncaloric bulking agents to replace sugar and part of the fat in artificially sweetened foods. A chocolate confectionery composition is disclosed in Example XXVII.

The object of the present invention is to provide chocolate confectionery compositions having significantly reduced fat and reduced calorie content.

SUMMARY OF THE INVENTION

The invention comprises low calorie, low fat chocolate confectionery compositions comprising cocoa, a nondigestible fatty polyester or polyether having a melting profile similar to chocolate confectionery fat, an artificial and/or natural sweetener and a partially or wholly nondigestible/reduced calorie carbohydrate bulking agent. The invention also comprises a novel sucrose polyester having melting characteristics similar to chocolate confectionery fat.

DETAILED DESCRIPTION OF THE INVENTION

In accordance with the present invention it has been found that highly acceptable reduced calorie, reduced fat chocolate confections can be prepared in which the confectionery fat (i.e., cocoa butter or cocoa butter plus milk fat) is wholly or partially replaced with a nondigestible fatty polyester or polyether having melting characteristics which match those of natural chocolate confectionery fat, and the sugar is wholly or partially replaced with an artificial sweetener or combination of artificial sweetener and partially or wholly nondigestible reduced caloric carbohydrate bulking agent. Compared to conventional chocolate confectionery compositions, the compositions of the present invention can provide 100% reduction in digestible fat content and a substantial reduction in calorie content.

Preferred low calorie chocolate confection compositions comprise:

(a) from about 5% to about 35% of a source of cocoa, selected from cocoa powder and chocolate liquor;

(b) from about 0.001% to about 60% of an artificial sweetener;

(c) from about 0% to about 60% of a partially or wholly nondigestible carbohydrate bulking agent;

(d) from about 25% to about 70% of a confectionery fat substitute which is a nondigestible fatty polyester or polyether having a clear melting point of 30°–36° C. and an SCI of at least 66 at a temperature 6.6° C. below its clear melting point.

All percentages herein are "by weight" unless specified otherwise.

If desired, compositions of the invention can be sweetened with natural sweetener (i.e., natural sugars) in which case the compositions comprise from 5–35% of the cocoa source of (a) above, 30–60% sugar and 25–70% of the substitute confectionery fat of (d) above.

The present invention also pertains to a specific nondigestible fat substitute which is a sucrose fatty acid polyester which has a clear (i.e., complete) melting point of about 34° C. and has an SCI (Solids Content Index) of about 75 at a temperature which is 6.6° C. below its clear melting point. This material is a sucrose esterification reaction product, wherein the esterifying fatty ester groups are myristate and laurate in a mole ratio of 5:3 and wherein the degree of esterification is greater than about 7.5.

Cocoa

The cocoa material used in the compositions of the present invention can be any of the chocolate liquors or cocoa powders used in the preparation of chocolate confections. Chocolate liquor typically contains about 50% natural cocoa butter. Cocoa powders typically contain from about 5% to about 30% natural cocoa butter. In order to obtain maximum fat and calorie reduction in the compositions of the present invention, low cocoa butter content cocoa powders are preferred. The amount of cocoa material in the compositions herein is from about 5% to about 35%.

Artificial Sweeteners

The artificial sweeteners to be used in the compositions of the invention can be any of those known for use in food products. Examples include saccharin, cyclamate, acesulfame K (American Hoechst), Gem Sweet (Cumberland Packing Corp.), L-sugars (Lev-O-Cal Biospherics), Hernandulcin (University of Illinois), Alitame (Pfizer), Thaumatins, trichloro sucrose, Rebaudioside A, L-aspartyl-L-phenylalanine methyl ester, aspartyl-D-valine isopropyl ester, aspartyl amino malonates, dialkyl aspartyl aspartates, stevioside, glycyrrhizin, p-phenetylurea, 5-nitro-2 propoxyaniline and neohesperidin dihydrochalcone. The term L-aspartyl-L-phenylalanine methyl ester and methyl L-aspartyl-L-phenylalanine are used interchangeably and correspond to the compound also known as aspartame. Preferred artificial sweeteners are saccharin, cyclamate, L-aspartyl phenylalanine methyl ester and acesulfame K.

Artificial sweeteners vary in their degree of sweetness. They range from equal to sucrose to greater than 50,000 times as sweet as sucrose. The amount of any particular sweetener used in the compositions herein will be an amount which is sufficient to provide the sweetness corresponding to the 30–60% sugar typically used in chocolate confectionery compositions. Since artificial sweeteners are known which are equal to or as much as fifty thousand times greater than sucrose, the amount of artificial sweetener in the compositions of the present invention will be from about 0.001% to about 60% of the composition. Because in many instances the amount of artificial sweetener which is used will be very small compared to the amount of sugar it replaces, in such instances a bulking agent will be included in the chocolate confectionery composition in order to retain the typical form and texture of a conventional chocolate confection. In most cases, the compositions herein will contain from about 0.001% to about 1% of artificial sweetener and from about 25% to about 60% of the bulking agent.

Bulking Agent

Bulking agents useful in the present invention are carbohydrates which are partially or wholly nondigestible (i.e., nonmetabolizable) and contribute substantially no taste to the product. Many such materials are known to the food product formulator. Specific examples include polydextrose, lactitol, Palatinit ® (isomalt), Palatinose ® (isomaltulose), polyglucose, polymaltose, carboxymethylcellulose, carboxyethylcellulose, arabinogalactan, microcrystalline cellulose and combinations thereof. The use of partially or wholly nondigestible carbohydrate bulking agents in dietetic foods is discussed in detail in U.S. Pat. Nos. 4,304,768, Staub et al., issued Dec. 8, 1981, and 3,876,794, Rennhard, issued Apr. 8, 1975, both incorporated by reference herein.

When a bulking agent is used in the compositions of the invention, the amount used will usually be in the range of from about 25% to about 60%.

Chocolate Confectionery Fat Substitute

The chocolate confectionery fat substitute in the compositions of the invention is a nondigestible fatty polyester or polyether which has a clear (i.e., complete) melting point of 30°–36° C. and an SCI (Solids Content Index) of at least 66 at a temperature of 6.6° C. below the clear melting point. Preferably the ester has an SCI of at least 40 at a temperature which is 3.3° C. below its clear melting point.

A wide variety of fatty polyesters and polyethers have been reported in the literature as being suitable as nondigestible substitutes for fat (i.e., triglyceride fat). The fatty moieties typically have carbon chain lengths of 8–24 carbon atoms. Examples of such materials are: fatty alcohol esters of polycarboxylic acids (U.S. Pat. No. 4,508,746, Hamm, issued Apr. 2, 1985); fatty polyethers of polyglycerol (U.S. Pat. No. 3,932,532, Hunter et al., issued Jan. 13, 1976 —food use disclosed in East German Pat. No. 207,070, issued Feb. 15, 1984); ethers and etheresters of polyols containing the neopentyl moiety (U.S. Pat. No. 2,962,419, Minich, issued Nov. 29, 1960); fatty alcohol diesters of dicarboxylic acids such as malonic and succinic acid (U.S. Pat. No. 4,582,927, Fulcher, issued Apr. 15, 1986); and triglyceride esters of alpha branched chain alkyl carboxylic acids (U.S. Pat. No. 3,579,548, Whyte, issued May 18, 1971; all incorporated herein by reference. Preferred nondigestible fatty esters for use in the present invention are polyol fatty acid polyesters having at least 4 fatty acid ester groups, wherein the polyol is selected from the group consisting of sugars and sugar alcohols containing from 4 to 8 hydroxyl groups and wherein each fatty acid group has from 8 to 24 carbon atoms.

Examples of sugars from which these polyol polyesters can be prepared are xylose, arabinose, galactose, fructose, sorbose, maltose, lactose and sucrose. Examples of sugar alcohols from which the polyol polyesters can be prepared are xylitol, erythritol and sorbitol. Examples of preferred sugars and sugar alcohols are erythritol, xylitol, sorbitol, glucose and sucrose. Sucrose is especially preferred.

Examples of fatty acids from which the fatty acid moieties of these polyol polyesters are derived include lauric, myristic, palmitic, stearic, oleic and behenic. Polyol polyesters, their use as substitutes for fat in foods, and their preparation are described in detial in U.S. Pat. Nos. 4,034,083, Mattson, issued July 5, 1977; 3,963,699, Rizzi, issued June 15, 1976; 4,518,772, Volpenhein, issued May 21, 1985; and 4,517,360, Volpenhein, issued May 14, 1985; all incorporated wherein by reference.

An example of a sugar fatty acid polyester which is suitable for use as a chocolate confectionery fat substitute in the compositions herein is a sucrose esterification product wherein the fatty acid ester groups are myristate and laurate in a mole ratio of about 5:3 and wherein the degree of esterification is greater than about 7.5. This material has a clear melting point of about 34° C. and an SCI at 27° C. of about 79.

Within any class of nondigestible fatty polyesters or polyethers, compounds which have the melting point and SCI characteristics required for confectionery fat substitutes in the present invention can be found empirically by varying the chain lengths of the alkyl and/or acyl moieties attached to the polycarboxylic or polyol backbone moiety. It is not possible to predict beforehand which compounds within a given class will have these properties.

The confectionery fat substitutes herein can also be used in formulating chocolate confections which are sweetened partially or entirely with natural sugars (e.g., sucrose).

The amount of confectionery fat substitute in the compositions of the invention will be from about 25% to about 70%.

The nondigestible fatty polyesters and polyethers provide bulk and structure, as well as mouth feel to the compositions, and therefore can be used as a partial replacement for sugar, as well as being a replacement for fat.

Optional Components

Materials which are customarily used in formulating chocolate confectionery compositions can be included in the compositions herein. For example if it is desired to formulate the composition of this invention as a milk chocolate, from about 10% to 20% whole or nonfat milk solids can be included. Other optional ingredients include any natural food flavoring oil, oleoresin or extract, artificial food flavorings, ground spice, ground coffee, ground nut meats, ground vanilla beans, dried malted cereal extract, salt, dietary fiber sources such as cocoa fiber, citrus fiber, wheat bran, corn bran, oat bran, pea bran and soy fiber, lecithin, and other emulsifying ingredients at levels conventionally used in chocolate confections. Also, if desired, some sugar, honey, molasses, maple sugar, brown sugar, may be included in the compositions, in which case the amount of artificial sweetener and bulking agent will be proportionately reduced. If desired, a combination of natural confectionery fats and confectionery fat substitutes can be used in compositions of the invention.

Nondigestible fatty esters can interfere with the body's uptake of fat-soluble vitamins, but it has been found that this problem can be overcome by fortifying foods containing such esters with fat-soluble vitamins such as Vitamins A, E, D and K (See U.S. Pat. No. 4,034,083, Mattson, issued July 5, 1977). Accordingly, fat-soluble vitamins are desirable additives for the present compositions.

Composition Preparation

A Typical Preparation Procedure for a Chocolate Bar of the Invention

The typical ingredients for the chocolate (chocolate liquor or cocoa powder, sweetener/bulking agent, sucrose polyester and lecithin) are weighed into a mixer and mixed for a period of time. After mixing, the resulting paste is passed through a mill (steel rollers) several times and converted to a powdery mass. Milling breaks up crystalline sweetener/bulking agent and fibrous cocoa matter into the desired particle size. After milling, the chocolate is subjected to conching. The conching temperature ranges from 55°–85° C., and the time of conching varies from a few hours to several days. Flavor, emulsifiers, and additional sucrose polyester are often added during conching. After conching, more emulsifiers and sucrose polyester are added to adjust the chocolate to final specification and the chocolate is tempered. Proper tempering ensures the production of a stable fat base which is critical to the overall quality and stability of chocolate. The final stage in the processing of chocolate is molding. The properly tempered chocolate is poured quickly into block molds, allowed to cool, and then removed from the mold as solid pieces.

Instead of bars, the chocolate compositions can be used as confectionery coatings or fillings or as chocolate pieces (e.g., chocolate chips for cookies).

The invention will be further illustrated by the following Examples.

EXAMPLE I

Preparation of the Sucrose Polyester Chocolate Confectionery Fat and the Data on Its Melting Point and SCI Into a 12-liter reaction flask fitted with an agitator, reflex condenser, nitrogen purge inlet, and vacuum line apparatus was added 491.2 gm anhydrous sucrose, 347.0 gm potassium stearate, 576.6 gm methyl laurate, 1088.2 gm methyl myristate, and 19.9 gm potassium carbonate. The reaction mix was heated with stirring to 135° C. Only a slight vacuum was pulled on the system at the beginning of the reaction to avoid excessive foaming. By the time the reaction mix had clarified, the system was under about a 10 mm Hg pressure. When the sucrose level in the reaction solution had reached less than 0.5%, another 807.6 gm of methyl laurate, 1523.5 gm of methyl myristate and 20 gm of potassium carbonate were added, and the reaction was allowed to proceed under controlled atmosphere. When the system was under 10 mm Hg pressure, N2 purging was introduced to get rid of residual methanol. The reaction was completed when the % octa ester of the crude reaction mix reached greater than 75%.

The crude reaction mix was allowed to cool to room temperature and centrifuged. The mother liquor (approx. 3500 ml) was collected and washed four times with hot water and dried by nitrogen sparging at 100° C. The dried material was then bleached with Filtrol at 82° C. under a nitrogen blanket for 2 hours. After filtration, the excess unreacted methyl esters were stripped off on a laboratory size wiped film evaporator under 2 mm Hg pressure at 165–166° C. using a feed rate of 5 ml/minute. The sucrose polyester product obtained readily solidified to a creamy yellowish solid and was analyzed to have: 200 ppm methyl esters; an average ester substitution of 7.7; M.P. of 33°–34° C.; SCI (by Differential Scanning Calorimetry) of 100 (10° C.), 93 (21° C.), 79 (26.7° C.), 5 (33.3° C.) 0 (40.6° C.). The weight of product obtained was 2240 gm, of which 70–80% was octa ester. The overall yield of sucrose polyester was 80% of theoretical, based on the weight of sucrose.

The sucrose polyester of this example can also be prepared by direct reaction of the acid chlorides of myristic and lauric acid with sucrose.

EXAMPLE II

Formulation and Preparation of a Reduced Calorie/Reduced Fat Milk Chocolate Bar Using Sucrose Polyester Chocolate Confectionery Fat, A Bulking Agent and an Artificial Sweetener 116.8 gm of chocolate liquor (containing approximately 50% cocoa butter), 110 gm of the sucrose polyester chocolate confectionery fat of Example I, and 1.0 gm of lecithin are added to a beaker, and the mixture is melted. The molten mix is added to a jacketed Hobart mixing bowl containing 4.2 gm aspartame, 312 gm powdered lactitol, and 108.2 gm nonfat dry milk powder. The resulting mixture is mixed on the Hobart mixer for about 20 minutes. After thorough mixing, the material is refined twice on a 4-roller mill to give a dry powdery mass. This mass is collected and weighed, and the material is conched at 57° C. for 1 hour before another 70.2 gm of the sucrose polyester confectionery fat is added to adjust the fat level to 31%. The mixture is allowed to continue conching at 57° C. for another 4 hours. After which, another 77 gm of the sucrose polyester chocolate confectionery fat is added to adjust the fat level to 39%. 1.8 gm of lecithin is also added, and the batch is ready for tempering. The sample is tempered in a temperometer fitted with a viscosity monitor. The sample is tempered by slowly cooling from 42° C. to 25° C. and then slowly warming up to 30° C. for seed crystal transformation. The tempered chocolate is then poured onto trays of bar mold and the trays are tunnelled through a 16° C. tunnel for 15 minutes. After which, the trays are set in the 16° C. room for 2 days before demolding. The bars demold with relative ease and the finished bars have a shiny appearance and are of good eating quality. The composition provides an 82% reduction in fat and 60% reduction in calories compared to a similar composition made with cocoa butter and sugar.

EXAMPLE III

Formulation and Preparation of a Reduced Calorie/Reduced Fat Milk Chocolate Bar Using Sucrose Polyester Chocolate Confectionery Fat 71.5 gm of anhydrous sucrose, 20 gm of nonfat dry milk, and 11.3 gm of cocoa powder (containing about 11% cocoa butter) are added into a jacketed Hobart mixing bowl. In a beaker, 27.4 gm of the sucrose polyester chocolate confectionery fat of Example I are melted together with 0.2 gm of lecithin. The melted mix is added to the rest of the ingredients in the mixing bowl, and the mixture is mixed at slow speed for about 15 minutes at room temperature. The sample is milled three times on the 3-roller mill to obtain a dry powdery mass. The weight is recorded, and the sample is returned to the Hobart mixer for conching at 65° C. for about 1-1/2 hours. Another 10.3 gm of sucrose polyester chocolate confectionery fat substitute is added to adjust the milk chocolate to 25% fat level, and the resulting sample is allowed to continue conching at 65° C. for another 24 hours. At the end of 24 hours, 8.1 more gm of the chocolate confectionery fat substitute and 0.5 gm of lecithin are added to adjust the fat content to 32%. The sample is then tempered in a temperometer by cooling slowly from 45° C. to 24.5° C. After holding for 15 minutes at 24.5° C., the chocolate is warmed back slowly to 31° C. and held at that temperature with constant stirring for another 15 minutes before pouring into trays or bar mold. After coming to room temperature, the trays are then placed in the 16° C. room for 2 days before demolding. The bars are demolded with relative ease and the bars obtained have a shiny appearance and are of good eating quality.

This composition provides a 97% reduction in fat and a 52% reduction in calories compared to a similar composition made with cocoa butter.

What is claimed is:

1. A reduced calorie chocolate confection composition comprising:
   (a) from about 5% to about 35% of a source of cocoa, selected from cocoa powder or chocolate liquor;
   (b) from about 0.001% to about 60% of an artificial sweetener;
   (c) from about 0% to about 60% of a partially or wholly non-digestible carbohydrate bulking agent;
   (d) from about 25% to about 70% of a chocolate confectionery fat substitute which is a non-digestible polyol fatty acid polyester having at least 4 fatty acid ester groups, wherein the polyol is selected from the group consisting of sugars and sugar alcohols containing from 4 to 8 hydroxyl groups and wherein each fatty acid group has from 8 to 24 carbon atoms, and having a clear melting point of 30°–36° C. and an SCI of at least about 66 at a temperature 6.6° C. below its clear melting point.

2. The composition of claim 1 wherein the polyol of the chocolate confectionery fat substitute is a sugar.

3. The composition of claim 2 wherein the amount of artificial sweetener is from about 0.001% to about 1% and the amount of bulking agent is from about 25% to about 60%.

4. The composition of claim 3 wherein the bulking agent is selected from the group consisting of polydextrose, lactitol and arabinogalactan.

5. The composition of claim 3 wherein the artificial sweetener is selected from the group consisting of saccharin, cyclamate, aspartame and acesulfame K.

6. The composition of any of the foregoing claims wherein the chocolate confectionery fat substitute is a polyester of sucrose.

7. The composition of claim 6 wherein the artificial sweetener is aspartame and the polyester of sucrose is a sucrose esterification product wherein the fatty acid ester groups are myristate and laurate in a mole ratio of about 5:3 and wherein the degree of esterification is greater than about 7.5.

8. A reduced calorie chocolate confection composition comprising:
   (a) from about 5% to about 35% of a source of cocoa, selected from cocoa powder and chocolate liquor;
   (b) from about 30% to about 60% of a natural sugar;
   (c) from about 25% to about 70% of a chocolate confectionery fat substitute which is a sucrose esterification product wherein the fatty acid ester groups are myristate and laurate in a mole ratio of 5:3 and wherein the degree of esterification is greater than about 7.5.

9. A novel chocolate confectionery fat substitute which is a sucrose esterification product wherein the fatty acid ester groups are myristate and laurate in a mole ratio of about 5:3 and wherein the degree of esterification is greater than about 7.5.

* * * * *

UNITED STATES PATENT AND TRADEMARK OFFICE
CERTIFICATE OF CORRECTION

PATENT NO. : 4,810,516

DATED : Mar. 7, 1989

INVENTOR(S) : Josephine L. Y. Kong-Chan

It is certified that error appears in the above-identified patent and that said Letters Patent is hereby corrected as shown below:

| | |
|---|---|
| Col. 1, Line 11 | "customers" should read --consumers-- |
| Col. 1, line 27 | "a-hydroxy" should read --$\alpha$-hydroxy-- |
| Col. 1, line 35 | "4,626,411" should read --4,626,441-- |
| Col. 4, line 26 | "detial" should read --detail-- |
| Col. 4, line 30 | "wherein" should read --herein-- |
| Col. 6, line 5 | "N2" should read --$N_2$-- |
| Col. 6, line 12 | "100°" should read --110°-- |
| Col. 6, line 52 | "31%" should read --32%-- |
| Col. 7, line 23 | "25%" should read --28%-- |

Signed and Sealed this

Twentieth Day of November, 1990

Attest:

HARRY F. MANBECK, JR.

Attesting Officer

Commissioner of Patents and Trademarks